(12) United States Patent
Nakagawa et al.

(10) Patent No.: US 7,770,713 B2
(45) Date of Patent: Aug. 10, 2010

(54) STORAGE HOPPER, AND COMBINATION WEIGHING DEVICE AND PACKAGING DEVICE PROVIDED WITH THE SAME

(75) Inventors: Yukio Nakagawa, Shiga (JP); Hiroshi Hattori, Shiga (JP); Teruo Hayakawa, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 19 days.

(21) Appl. No.: 12/302,425

(22) PCT Filed: May 24, 2007

(86) PCT No.: PCT/JP2007/060579
§ 371 (c)(1),
(2), (4) Date: Nov. 25, 2008

(87) PCT Pub. No.: WO2007/142039
PCT Pub. Date: Dec. 13, 2007

(65) Prior Publication Data
US 2009/0194558 A1    Aug. 6, 2009

(30) Foreign Application Priority Data
Jun. 6, 2006   (JP)   ............................... 2006-156993

(51) Int. Cl.
*B65G 47/04* (2006.01)

(52) U.S. Cl. .......................... 198/530; 198/532; 198/534

(58) Field of Classification Search ................. 198/530, 198/532, 534
See application file for complete search history.

(56) References Cited

U.S. PATENT DOCUMENTS

| 1,473,633 | A | * | 11/1923 | Lea | ............................ 198/534 |
| 2,278,730 | A | * | 4/1942 | Neuman | ..................... 198/532 |
| 2,676,733 | A | * | 4/1954 | Lober | ......................... 222/202 |
| 4,454,924 | A | | 6/1984 | Minamida | |
| 4,465,150 | A | | 8/1984 | Matsumoto | |
| 4,658,992 | A | * | 4/1987 | Peleus | ......................... 222/199 |
| 6,622,849 | B1 | * | 9/2003 | Sperling | ..................... 198/533 |
| 2003/0213217 | A1 | | 11/2003 | Kondo et al. | |

FOREIGN PATENT DOCUMENTS

| GB | 2212788 | A | * | 8/1989 |
| JP | S62-143601 | U | | 9/1987 |
| JP | H03-240637 | A | | 10/1991 |
| JP | 04197918 | A | * | 7/1992 |
| JP | H08-271327 | A | | 10/1996 |
| JP | 2681104 | B | | 8/1997 |
| JP | H11-292190 | A | | 10/1999 |

\* cited by examiner

*Primary Examiner*—Mark A Deuble
(74) *Attorney, Agent, or Firm*—Global IP Counselors, LLP

(57) ABSTRACT

A storage hopper temporarily stores articles supplied from above and then discharges the articles downward. The storage hopper includes a holding member of an article holding change mechanism in a storage portion. The holding member changes a state in which the articles are held in the storage portion according to a state of the articles.

10 Claims, 15 Drawing Sheets

STORAGE HOPPER, AND COMBINATION WEIGHING DEVICE AND PACKAGING DEVICE PROVIDED WITH THE SAME

This U.S. national phase application claims priority to Japanese Patent Application No. 2006-156993 filed on Jun. 6, 2006. The entire disclosure of Japanese Patent Application No. 2006-156993 is hereby incorporated herein by reference.

TECHNICAL FIELD

The present invention relates to a storage hopper that temporarily stores articles supplied from above and then discharges the articles downward, and a combination weighing device and a packaging device provided with the same.

BACKGROUND ART

As is well known, among combination weighing devices, there is a type of device in which articles discharged from a plurality of weighing hoppers selected by combination calculation are delivered to storage hoppers via a chute or the like, temporarily stored in these storage hoppers, and then discharged to a downwardly disposed packaging device and the like.

When this type of combination weighing device and packaging device are used, the opening and closing operation of the weighing hoppers and the packaging operation of the packaging device are performed at a predetermined time interval in order to adequately secure a gap between a batch of articles weighed first and a batch of articles weighed subsequently. A reduction in this time interval leads to acceleration of the process in the article weighing and packaging line. In order to achieve such effect, the articles need to be adequately delivered from the combination weighing device to the packaging device.

However, as described in Japanese Utility Model Laid-Open Publication No. 62-143601, depending on the state of the articles, there is a case where the articles bounce up and down the chute, causing a delay in the arrival of the articles, and by the time these articles arrive the storage hoppers, the storage hoppers are in an open state for the next batch. In this case, the articles are supplied, without being stored in the storage hoppers, to the packaging device at a timing different from the normal timing. This causes a packaging defect. Therefore, a device described in Japanese Utility Model Laid-Open Publication No. 62-143601 includes a second storage hopper disposed below a storage hopper (timing hopper). The opening and closing timing of the second storage hopper is delayed relative to the storage hopper. Then, the articles that have passed through without being stored in the storage hopper disposed above are temporarily stored in the second storage hopper and then discharged, and the operation timing of a packaging device is delayed accordingly. Thereby, the articles can be delivered to the packaging device in a favorable manner.

On the other hand, in view of the uselessness of the uniform opening and closing operation of a gate of a storage hopper (timing hopper) regardless of the characteristics and amount of articles, Japanese Patent No. 2681104 discloses a device in which the opening and closing speed and the opening degree of the gate of the storage hopper can be set in accordance with the type and amount of articles.

In addition, Japanese Patent Laid-Open Publication No. 11-292190 discloses a device that discharges articles from a storage hopper to a container. In this device, a replaceable insertion cylinder is disposed in the storage hopper (hopper for discharging articles) such that the articles can be adequately discharged into the container even when the shape and opening size of the container vary depending on the articles. The insertion cylinder has an opening whose size is in accordance with the opening size of the container, the characteristics and volume of the articles, and the like.

The articles are discharged by passing through the insertion cylinder.

DISCLOSURE OF THE INVENTION

However, the device described in Japanese Utility Model Laid-Open Publication No. 62-143601 has a problem that the height of the device becomes high since the storage hopper and the second storage hopper are disposed above and below.

In addition, with the device described in Japanese Patent Laid-Open Publication No. 11-292190, it is necessary to provide numerous insertion cylinders according to the characteristics, amount of the articles, and the like. The device also has a problem that the insertion cylinder needs to be replaced each time the type of articles to be processed is changed. In addition, when the diameter of the insertion cylinder is small, there is a problem that articles cannot easily flow in from above.

Further, when the high speed operation is attempted, the use of the conventional storage hopper causes the tailing of articles due to the contact resistance between the articles and the inner surface of the storage hopper (or the insertion cylinder). Although this problem cannot be overlooked, none of the conventional devices described above mentions anything about this problem.

It is therefore an object of the present invention to provide a storage hopper capable of reducing the tailing of articles discharged from the storage hopper regardless of the state of the articles, and capable of achieving a further acceleration of the process, and a combination weighing device and a packaging device provided with the same.

Note that "tailing" is a phenomenon in which the distance between the head and the tail end of a batch of articles discharged from the storage hopper lengthens.

A storage hopper according to a first aspect of the present invention temporarily stores articles supplied from above and then discharges the articles downward. The storage hopper includes a gate unit and an article holding state changing unit. The gate unit is configured and arranged to selectively form at least part of a storage portion defining a space for storing the articles by switching between a storing position in which the articles are stored and a discharge position in which the articles are discharged. The article holding state changing unit is configured and arranged to change a state in which the articles are held in the storage portion according to a state of the articles supplied to the storage portion. The article holding state changing unit includes a holding member forming a housing space for housing the articles within the storage portion, and a driving device configured and arranged to move the holding member to change a size of the housing space with an amount of movement of the holding member being adjusted according to a volume or characteristics of the articles supplied to the storage portion.

In addition, it is more preferable that the article holding state changing unit is configured and arranged to gather the articles supplied to the storage portion and to change the state in which the articles are held in the storage portion such that the volume of the articles is reduced.

A storage hopper according to a second aspect of the present invention temporarily store articles supplied from above and then to discharge the articles downward. The storage hopper includes a gate unit and an article holding state changing unit. The gate unit is configured and arranged to selectively form at least part of a storage portion defining a space for storing the articles by switching between a storing position in which the articles are stored and a discharge position in which the articles are discharged. The article holding state changing unit is configured and arranged to gather the articles supplied to the storage portion and to change a state in which the articles are held within the storage portion such that a volume of the articles is reduced. The article holding state changing unit includes a holding member forming a housing space for housing the articles within the storage portion, and a driving device configured and arranged to move the holding member to change a size of the housing space such that the housing space becomes smaller when gathering the articles, and the housing space becomes larger when discharging the articles.

In addition, it is more preferable that the driving device is configured and arranged to move the holding member such that the housing space becomes larger when receiving the articles.

A storage hopper according to a third aspect of the present invention temporarily store articles supplied from above and then to discharge the articles downward. The storage hopper includes a gate unit and an article holding state changing unit. The gate unit is configured and arranged to selectively form at least part of a storage portion defining a space for storing the articles by switching between a storing position in which the articles are stored and a discharge position in which the articles are discharged. The article holding state changing unit is configured and arranged to gather the articles supplied to the storage portion and to change a state in which the articles are held within the storage portion such that a volume of the articles is reduced. The article holding state changing unit includes at least first and second holding members forming a housing space for housing the articles within the storage portion, and a driving device configured and arranged to move the holding member to change a size of the housing space, the driving device being configured and arranged to move the first and second holding members closer to each other when gathering the articles and away from each other when discharging the articles.

In addition, it is more preferable that the driving device is configured and arranged to move the first holding member and the second holding member away from each other when receiving the articles.

In addition, it is more preferable that the gate unit includes a pair of members rotatably supported at the upper portion thereof, and configured and arranged to form the storage portion when the gate unit is in the storing position, and to move away from a space below the articles when the gate unit is in the discharging position. Further, it is more preferable that the gate unit forms a beak-shape having a downward pointing end in a lateral view.

In addition, it is more preferable that the holding member extends to the vicinity of the lower end of the gate unit when the gate unit is in the storing position.

In addition, the storage hopper according to the present invention may be part of a combination weighing device. The combination weighing device that includes this type of storage hopper is a device which temporarily stores articles discharged from a plurality of weighing hoppers selected by combination calculation and then discharges the articles downward.

In addition, the storage hopper according to the present invention may be part of a packaging device. The packaging device that includes this type of storage hopper is a device which temporarily stores articles supplied from above and then discharges the articles downward for packaging.

According to the present invention, a state in which the articles are held changes according to the state of the articles supplied to the storage portion, thus enabling reduction of the tailing of the articles that are discharged downward. Consequently, acceleration of the process can be achieved.

In addition, when the configuration is such that a state in which the articles are held changes according to the volume or characteristics of the articles, it is possible to more adequately reduce the tailing of the articles and accelerate the process.

In addition, when the configuration is such that the article holding state changing unit gathers the articles supplied to the storage portion and changes a state in which the articles are held so as to reduce the volume of the articles, there will be no need to replace the article holding state changing unit for each type of articles.

Further, when the configuration is such that the article holding state changing unit includes the holding member and the driving device, and the driving device moves the holding member to increase the housing space when receiving the articles, to reduce the housing space when gathering the articles, and to increase the housing space when discharging the articles, then the blocking of the articles when the articles are received is reduced and the tailing of the articles is also reduced because there is less contact between the articles and the holding member at the time of discharging. Note that when the contact between the articles and the article holding state changing unit hardly becomes a problem, a state in which the articles are released at the time of discharging may be omitted.

In addition, when the gate unit is formed by a pair of members rotatable about the upper portion thereof and the gate unit is beak-shaped with a downward pointing end in a lateral view, it is possible to gather the articles by the gate unit as well. Further, when the holding member extends to the vicinity of the lower end of the gate unit in a state of storing the articles, the articles accumulated in the lower portion of the housing space can be gathered in a favorable manner.

In addition, when the storage hopper according to the present invention is configured as part of a combination weighing device or part of a packaging device, it is possible to reduce the height of the device by placing the article holding state changing unit within the height of the storage portion.

DETAILED DESCRIPTION OF PREFERRED EMBODIMENTS

The preferred embodiments of the invention are described below.

First Embodiment

Configuration of Combination Weighing Device

Figure 1:
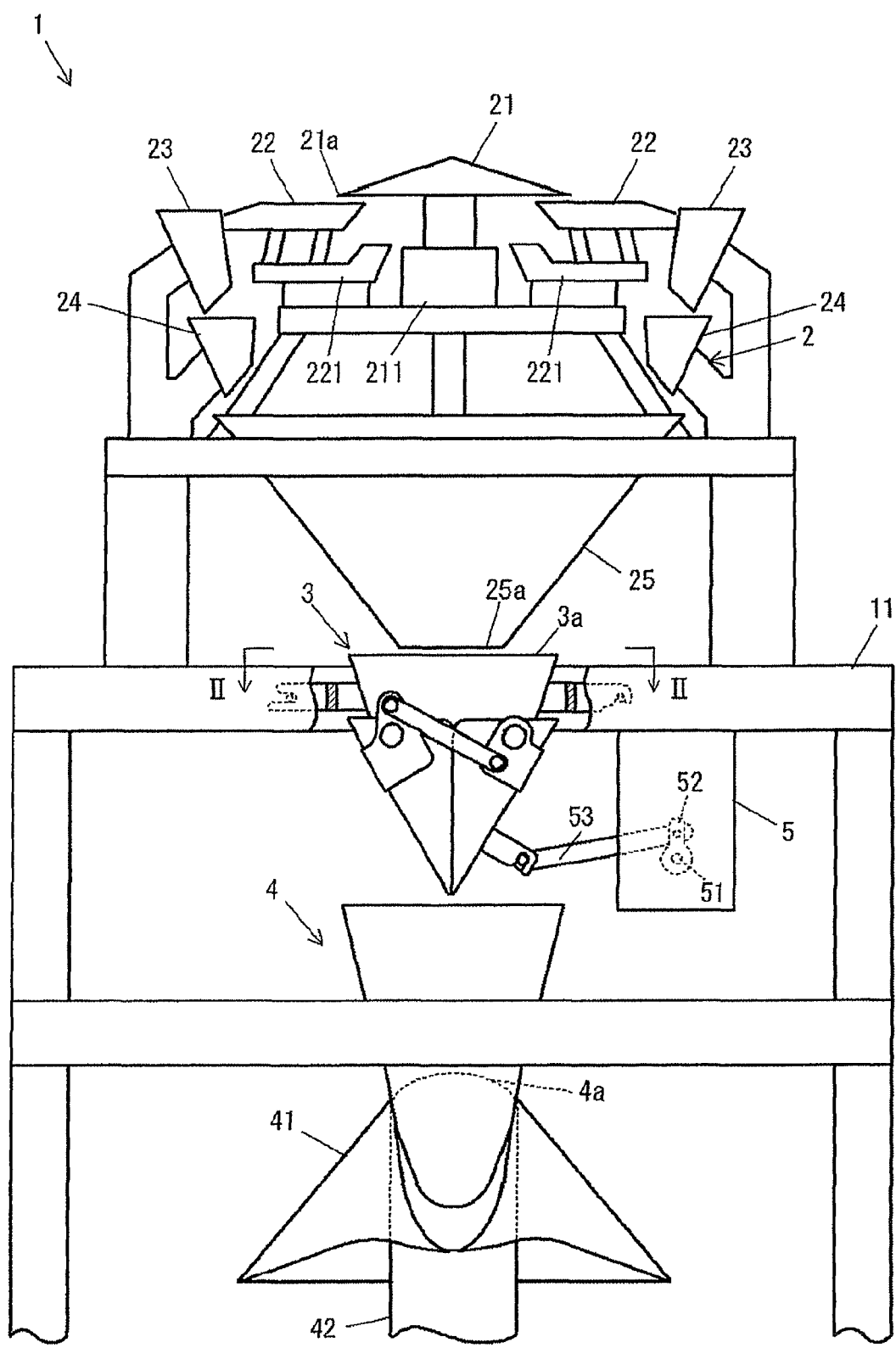
FIG. 1 is a side elevation view of a combinational weighing device including a storage hopper according to a first embodiment of the present invention.

As shown in FIG. 1, a combination weighing device 1 according to the present embodiment is disposed in the space above a packaging device 4 and includes a machine table 11, a weighing unit 2, a storage hopper 3, and the like. The weighing unit 2 is supported by the machine table 11 and discharges articles weighed to a predetermined weight at each predetermined time interval. The storage hopper 3 receives from a top opening 3a the articles weighed to a predetermined weight by the weighing unit 2, temporarily stores the articles, and supplies the articles to a receiving opening 4a of the packaging device 4 disposed below.

The weighing unit 2 includes a dispersion table 21, a plurality of vibrating troughs 22 . . . 22, a plurality of pool hoppers 23, a plurality of weighing hoppers 24 . . . 24, and a collection chute 25.

The articles are dropped to the dispersion table 21 from an article supply device (not shown) disposed above. The dispersion table 21 is a conically shaped table. By being slightly vibrated by a vibrator 211, the dispersion table 21 causes the articles to be dispersed into a plurality of radially formed paths and dropped from a peripheral portion 21a.

The vibrating troughs 22 . . . 22 are radially arranged around the dispersion table 21. Each vibrating trough 22 receives the articles dispersed into the plurality of paths by the dispersion table 21 and supplies the articles by a substantially constant amount to the pool hoppers 23 by being vibrated by a vibrator 211.

The pool hoppers 23 are circularly disposed correspondingly to the vibrating troughs 22 . . . 22. The pool hopper 23 temporarily holds the supplied articles, and discharges the articles by dropping them when a weighing hopper 24 disposed immediately below is empty.

The weighing hoppers 24 . . . 24 are disposed below the pool hopper 23 . . . 23 in a corresponding manner thereto. The weighing hoppers 24 . . . 24 weigh the weight of the articles by the load cells. The weighing unit 2 performs combination calculation of the weighed articles, selects the weighing hoppers 24 . . . 24 reaching a predetermined target weight, and discharges the articles by dropping them from the selected weighing hoppers 24 . . . 24 to the collection chute 25.

The collection chute 25 is disposed below the weighing hoppers 24 . . . 24. The collection chute 25 collects the articles (a batch of articles) supplied from the weighing hoppers 24 to one location and discharges the articles from a discharge opening 25a at the bottom.

Figure 2:
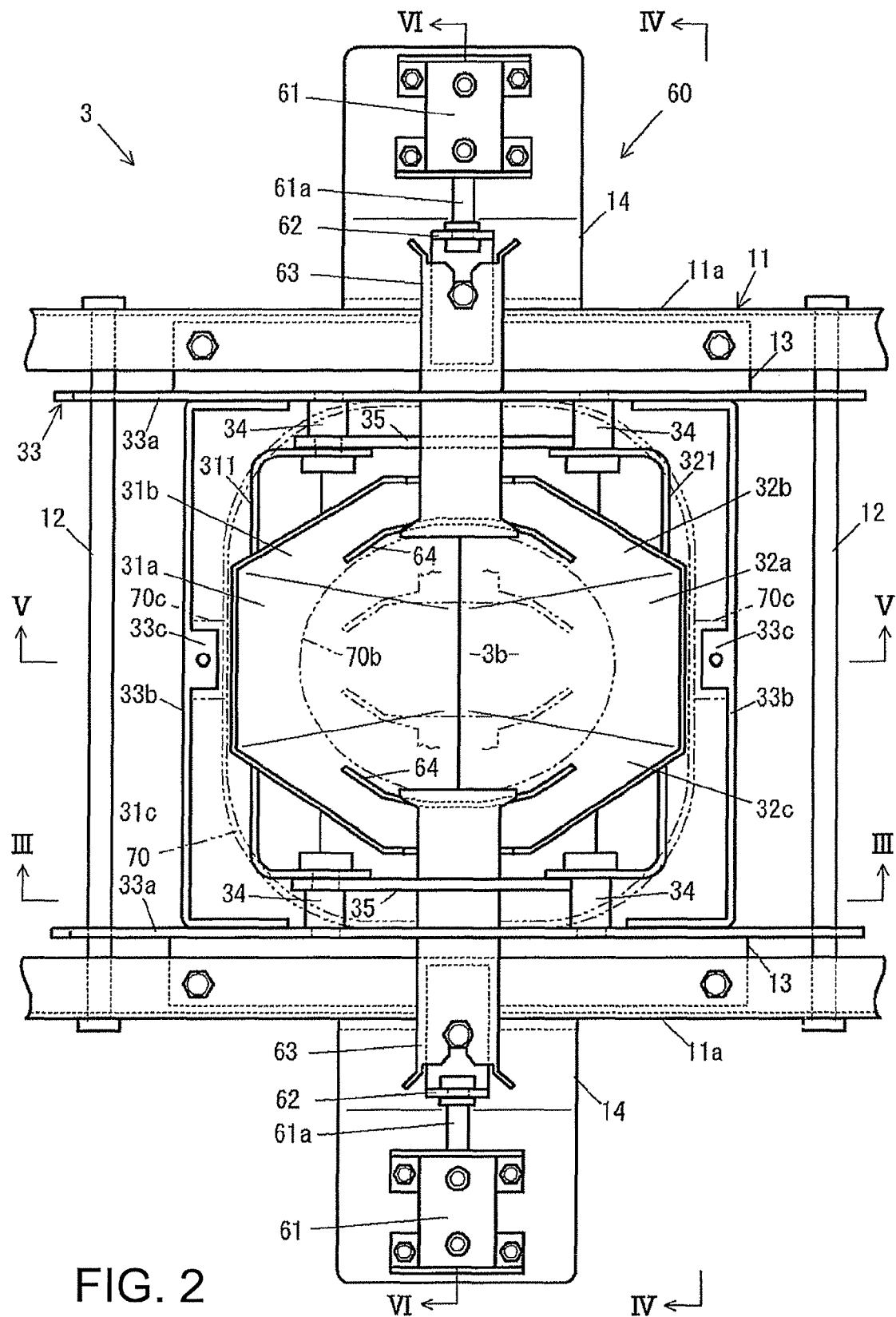
FIG. 2 is an enlarged top plane view taken along line II-II in FIG. 1 (a guide member 70 is omitted).
Figure 3:
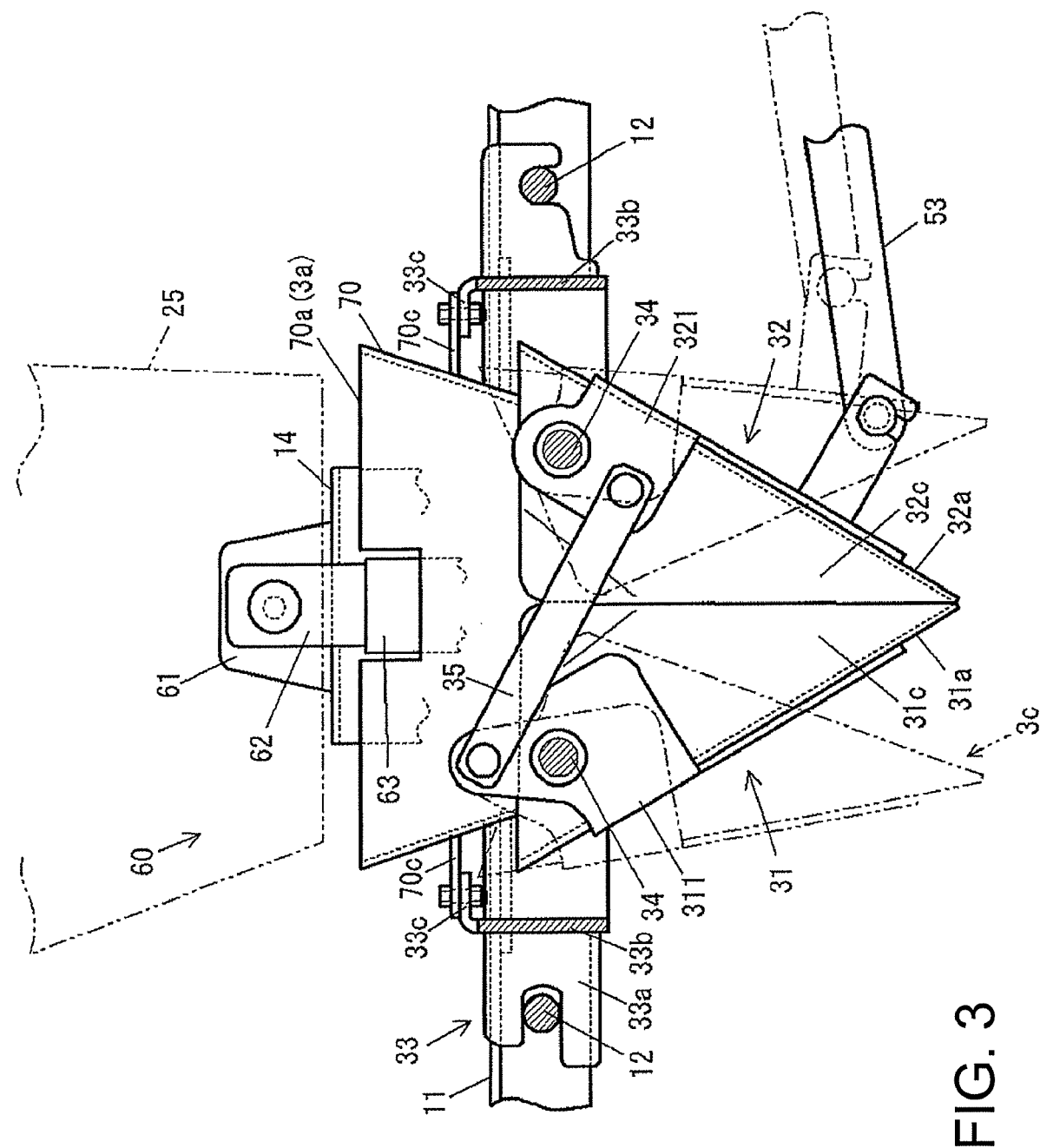
FIG. 3 is a cross sectional view taken along line III-III in FIG. 2 (an article holding change mechanism 60 disposed on the front side is omitted).
Figure 4:
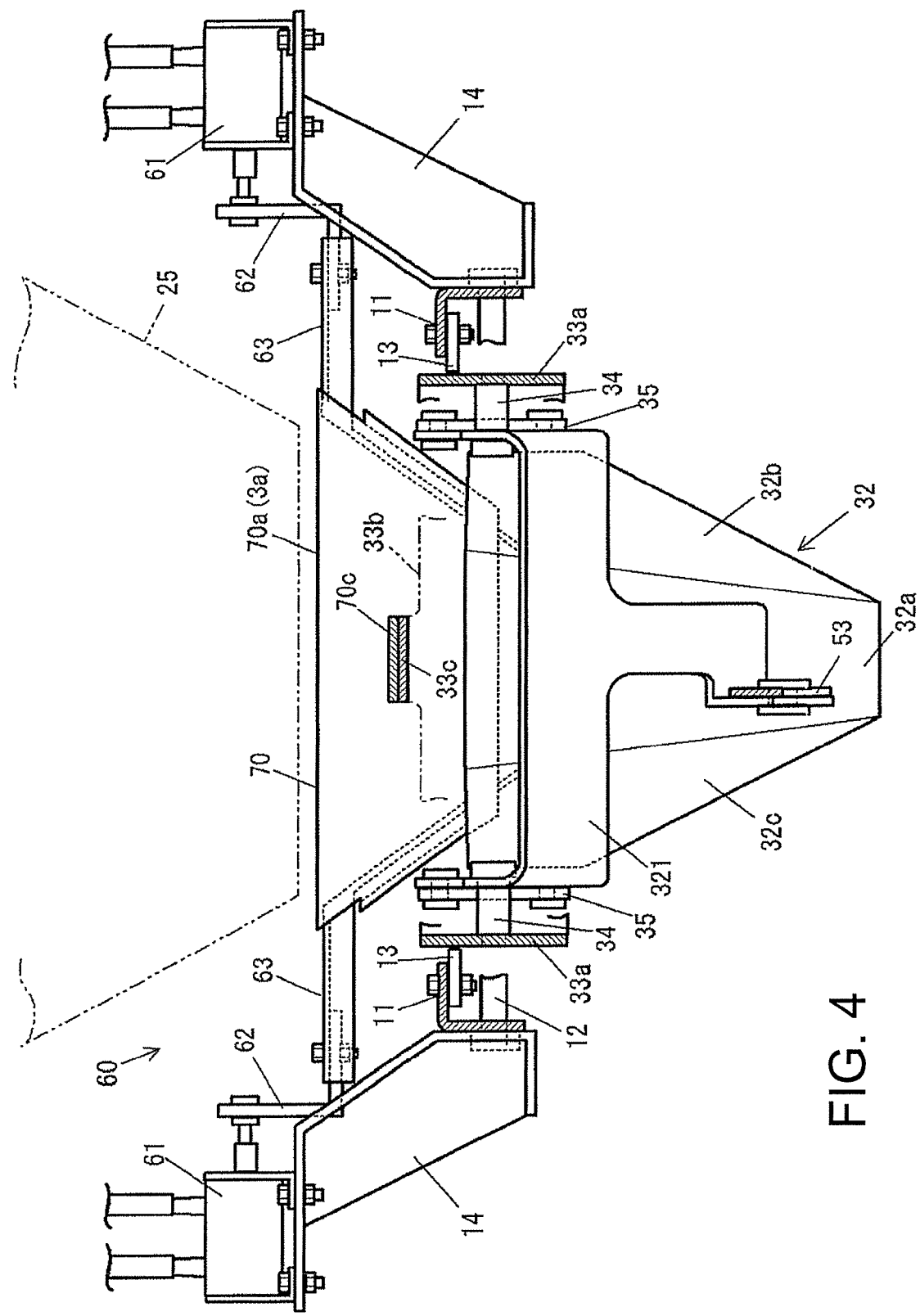
FIG. 4 is a cross sectional view taken along line IV-IV in FIG. 2.

The storage hopper 3 temporarily stores the articles discharged from the collection chute 25 and discharges the articles at a predetermined timing corresponding to the working cycle of the packaging device 4. As shown in FIGS. 2 and 3, the storage hopper 3 is supported by the machine table 11 via axial members 12, 12 and a bracket 33. The axial members 12, 12 are disposed between frame members 11a, 11a of the machine table 11 with a gap therebetween. The bracket 33 is formed in a frame shape by plate members 33a, 33a, 33b, and 33b, and disposed across the axial members 12, 12. A plate member 13 fixed to the frame members 11a, 11a prevents the movement of the bracket 33 in an axial direction of the axial members 12, 12.

In addition, the storage hopper 3 includes a pair of the gates 31, 32 (gate unit). The pair of the gates 31, 32 includes base portions 31a, 32a that receive the articles, and lateral side portions 31b, 31c, 32b, 32c that extend from both lateral ends of the base portions 31a, 32a. The pair of gates 31, 32 is supported by plate members 33a, 33a of the bracket 33 via support pins 34 . . . 34. A base end portion 311 of the gate 31 and a base end portion 321 of the gate 32 are interlinked via links 35, 35. Operation of a gate drive mechanism 50 (described below) causes the gates 31, 32 to rotate (oscillate) about the support pins 34, 34. Thereby the gates 31, 32 can change the position between a closed position in which the storage portion is inwardly formed (see solid lines in FIG. 3) and an open position in which an opening 3c is formed at the bottom (see two-dot chain lines in FIG. 3).

Here, the gates 31, 32 are inclined such that the base portions 31a, 32a, and the lateral side portions 31b, 31c, 32b, 32c are inwardly extended in a downward direction. In other words, the gates 31, 32 are beak-shaped with a downward pointing end (lower end). Accordingly, the articles that entered from above into the storage portion defining a space formed by the gates 31, 32 are naturally gathered to the center while dropping along the base portions 31a, 32a and the lateral side portions 31b, 31c, 32b, 32c.

As shown in FIG. 1, a gate driving device 5 that rotatably opens and closes the gates 31, 32 is fixed to the machine table 11 so as to be positioned lateral to the gate 32. The gate driving device 5 includes a crank arm 52 attached to a motor-driven rotation axis 51, and an oscillating link 53 that interlinks the crank arm 52 and the gate 32. When the rotation axis 51 makes a half rotation, the gates 31, 32 oscillate from the closed position indicated by solid lines to the open position indicated by two-dot chain lines in FIG. 3 as described above. When the rotation axis 51 makes a further half rotation, the gates 31, 32 oscillate back to the original closed position.

The packaging device 4 shown in FIG. 1 is a type of packaging device as disclosed in U.S. Published Application No. 2003/0213217, in which a band-like film unwound from a film roll (not shown) is introduced to a former 41, wound around a tube 42, and thus formed into a tubular film. A suction belt (not shown) is disposed on the lower lateral surface of the tube 42, which conveys the tubular film downward. An overlapping portion on the side and a lower end portion of the tubular film are weld sealed during conveyance, and top end portion thereof is weld sealed in a state in which the articles supplied from the storage hopper 3 via the receiving opening 4a are inside. Consequently, the tubular film becomes a bag in which the articles are completely packaged. Note that, with the packaging device 4, a band-like film is changed according to the type and amount of the articles, and the former 41 and the tube 42 are replaced with the ones whose receiving opening 4a is in a different size.

Figure 5:
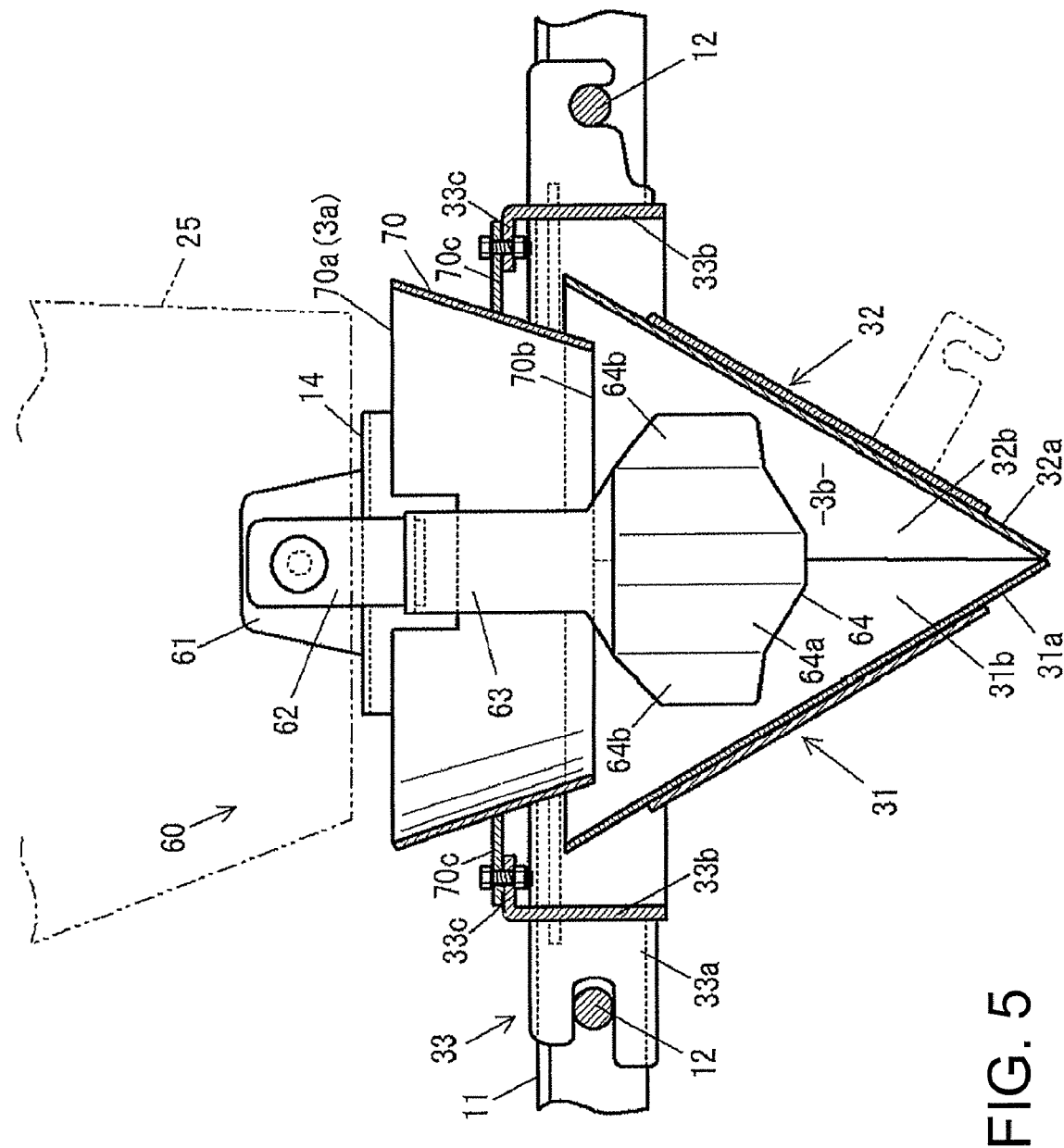
FIG. 5 is a cross sectional view taken along line V-V in FIG. 2.
Figure 6:
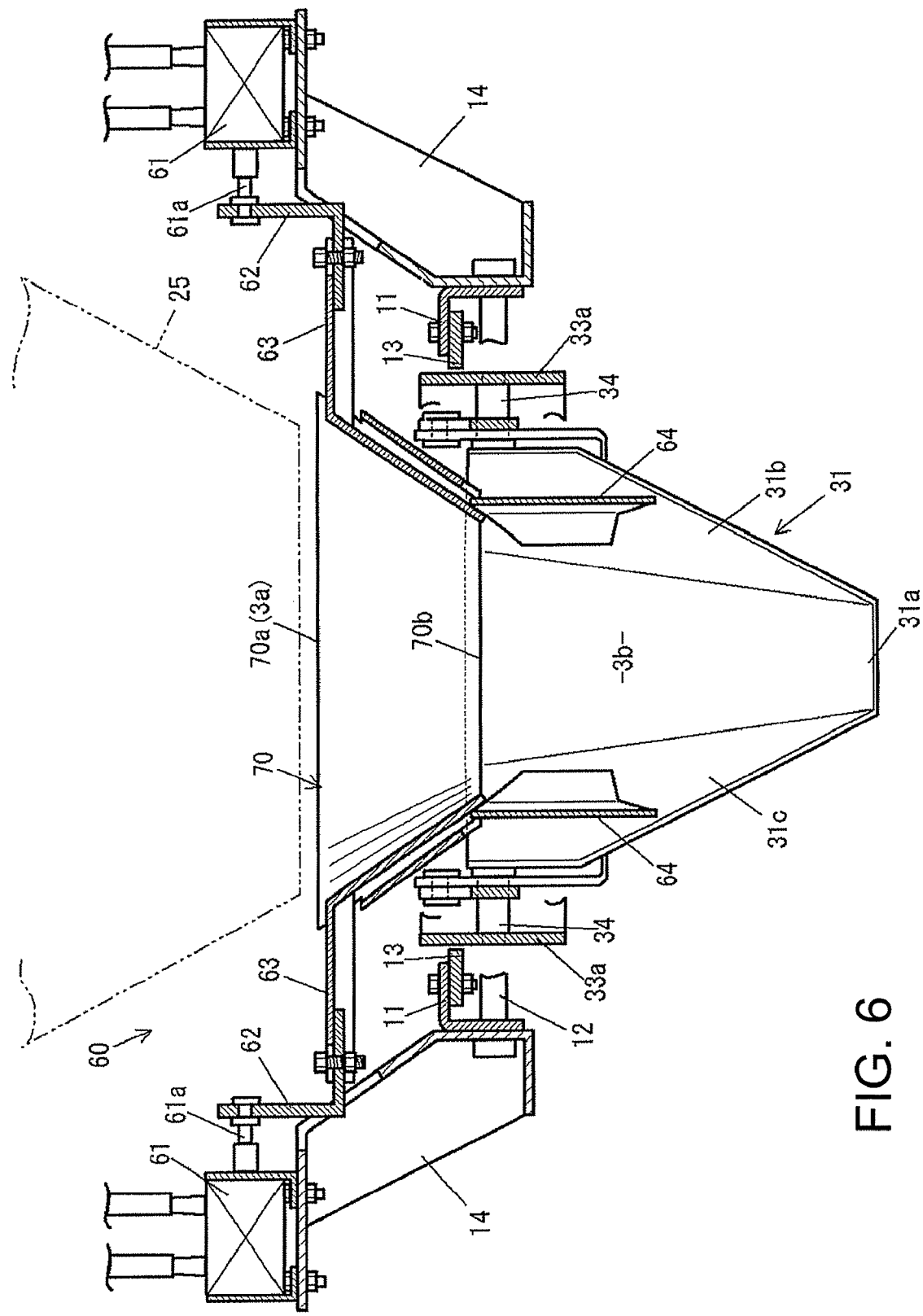
FIG. 6 is a cross sectional view taken along line VI-VI in FIG. 2.

Incidentally, in the present embodiment, as shown in FIGS. 2, 5, and 6, the storage hopper 3 includes the article holding change mechanism 60 that changes a state in which the articles are held in the storage portion.

This article holding change mechanism 60 includes holding members 64, 64 arranged inside the storage portion, and a driving device that moves these holding members 64, 64 closer to or away from each other in a horizontal direction.

As shown in FIGS. 2, 5, and 6, the holding member 64 is a plate shaped member, and includes a base surface portion 64a, which are jointly connected to a linking member 63, and lateral surface portions 64b, 64b. The lateral surface portions 64b, 64b extend from both lateral ends of the base surface portion 64a toward the opposite holding member 64 side and then to the left and right. Here, articles X are supplied to a space between both holding members 64, 64 by the guide member 70 (described below). In other words, an article housing space 3b where the articles are virtually housed in the storage portion is formed by both holding members 64, 64.

The driving device includes an air cylinder 61, and first and second linking members 62, 63 for each holding member 64, 64. The air cylinder 61 is arranged on a mounting table 14 fixed to the machine table 11 such that the axial direction of a cylinder rod 61a is perpendicular to the opening and closing direction of the gates 31, 32. The first and second linking members 62, 63 interlink the cylinder rod 61a of the air cylinder 61 and the holding member 64. The driving device moves the holding members 64, 64 between a spaced apart state as indicated by solid lines and a closely spaced state as indicated by imaginary lines in FIGS. 2 and 6, by extending and contracting the cylinder rods 61a, 61a of the air cylinders 61, 61 at the same time. More specifically, the driving device keeps the holding members 64, 64 away from each other when the storage hopper 3 is in a state of receiving the articles as shown in FIG. 6, and moves the holding members 64, 64 closer to each other immediately after the articles are fed. In addition, at the time of discharging the articles, the holding members 64, 64 are moved away from each other simultaneously with the opening of the gates 31, 32 (or at a timing before or after the opening timing of the gates 31, 32) to release the articles X. Note that the gap between the holding members 64, 64 when they are close to each other is set such that a batch of articles X gathered together is smaller than the receiving opening 4a of the packaging device 4 in a plan view.

The guide member 70 is disposed in a space between the discharge opening 25a of the collection chute 25 and the top opening 3a of the storage hopper 3. The guide member 70 includes opening portions 70a, 70b on the top and bottom. The inner edge of the lower opening portion 70b of the guide member 70 is located more inwardly than the holding members 64, 64 in a state in which the holding members 64, 64 are spaced apart. Consequently, the articles discharged from the discharge opening 25a of the collection chute 25 are guided between the holding members 64, 64.

Operation of Combination Weighing Device

When the articles are supplied from above to the combination weighing device 1, these articles are supplied to the weighing hoppers 24 . . . 24 via the dispersion table 21, the vibrating troughs 22 . . . 22, and the pool hopper 23 . . . 23, and then supplied from the weighing hoppers 24 . . . 24 to the storage hopper 3 via the collection chute 25 at every predetermined time interval.

Figure 7:
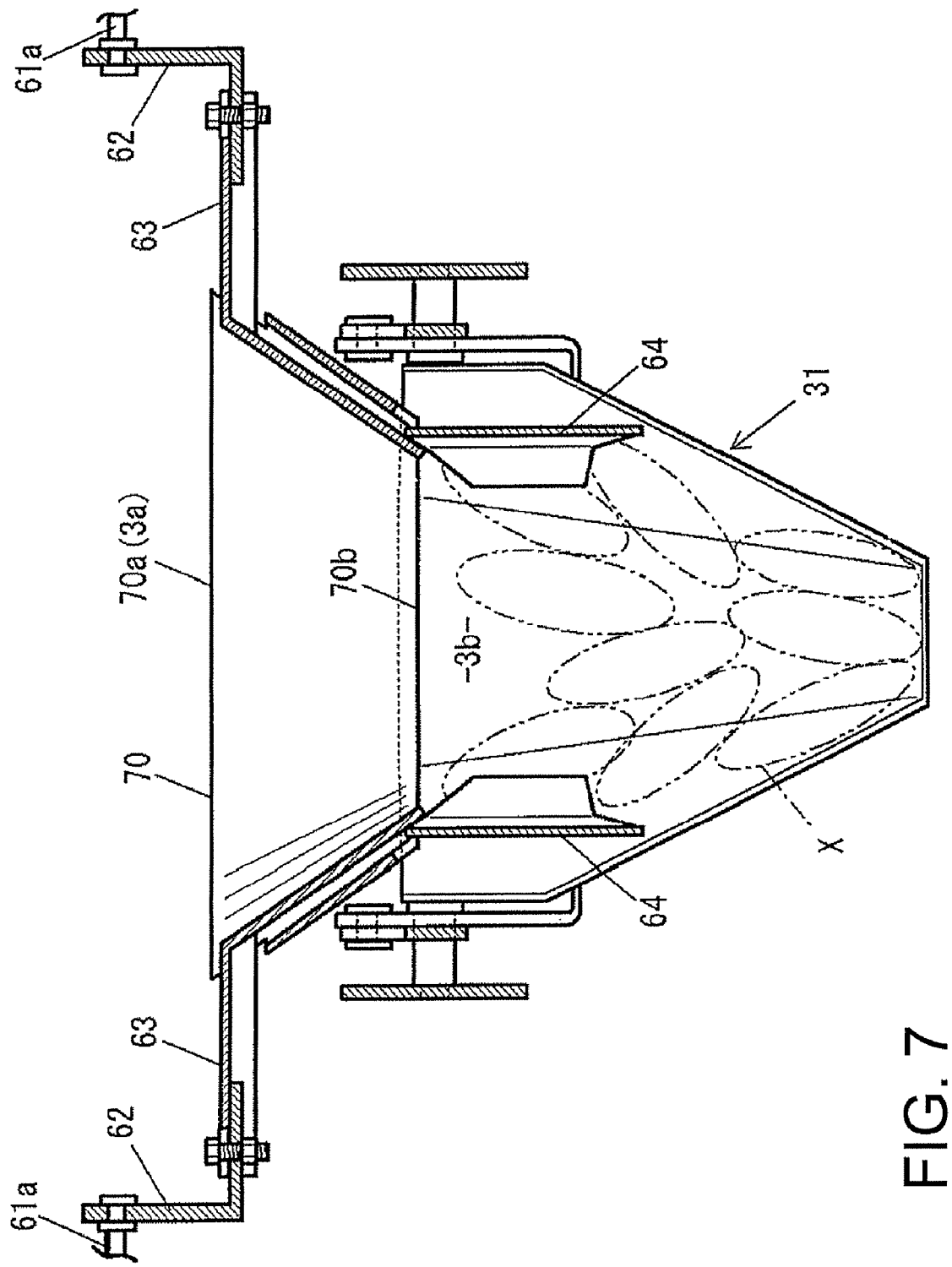
FIG. 7 is a view corresponding to FIG. 6 illustrating a state immediately after articles are received.

In a state of receiving the articles, the storage hopper 3 is controlled by the gate driving device 5 such that the gates 31, 32 are in a closed state, as indicated by solid lines in FIG. 6. In addition, the cylinder rods 61a, 61a of the air cylinders 61, 61 are controlled and set to a contracted state. Consequently, the holding members 64, 64 move away from each other, thus increasing the article housing space 3b. Therefore, as shown in FIG. 7, it is possible to receive the articles X supplied from above in a favorable manner. In addition, since the guide member 70 is disposed between the discharge opening 25a of the collection chute 25 and the top opening 3a of the storage hopper 3, the articles X discharged from the discharge opening 25a of the collection chute 25 can be guided into the article housing space 3b in a favorable manner.

Figure 8:
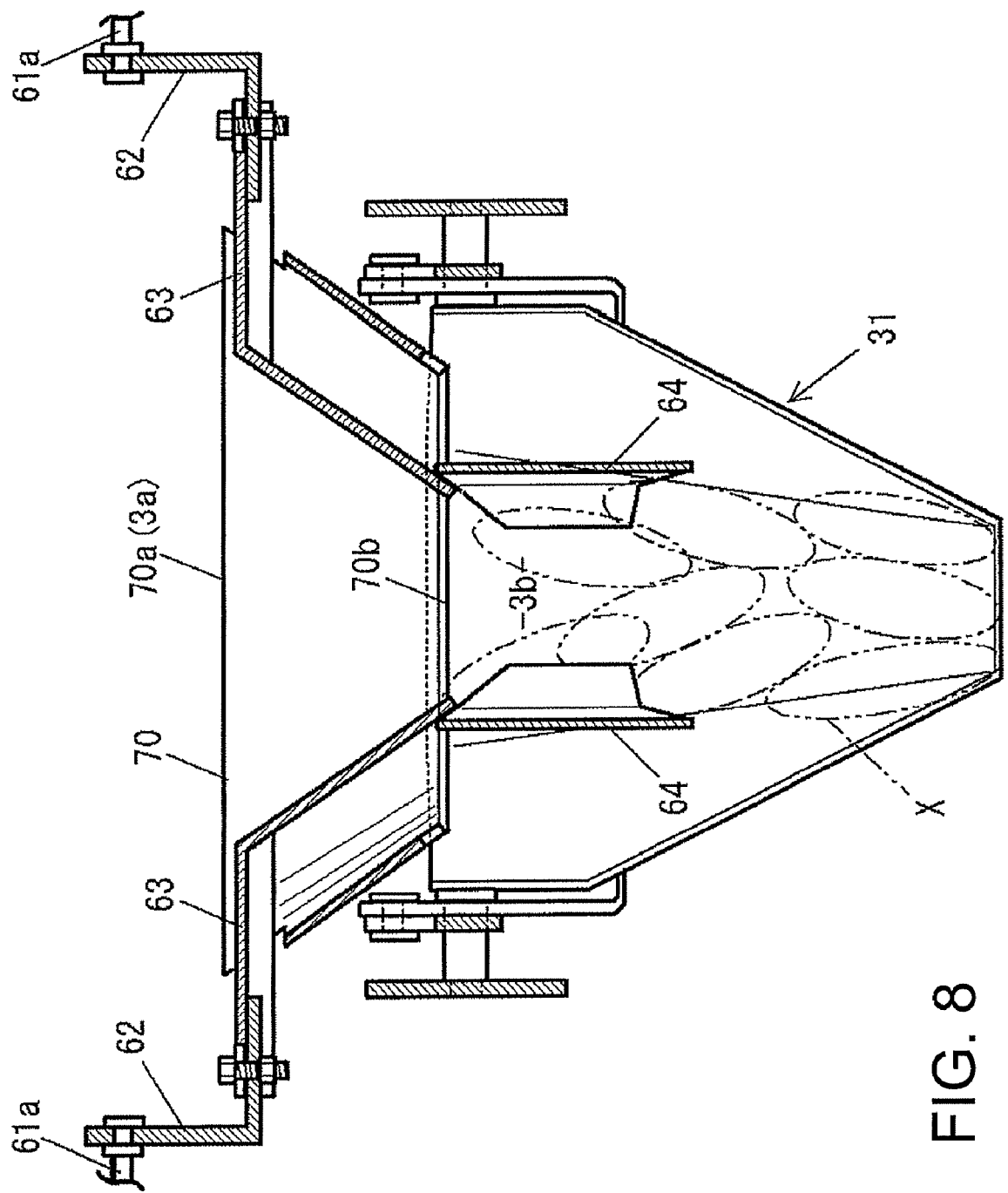
FIG. 8 is a view corresponding to FIG. 6 illustrating a state in which the articles are gathered.

Then, after the articles X are fed into the article housing space 3b of the storage hopper 3 (for example, at a predetermined period of time after the feeding control of the articles has started), the cylinder rods 61a, 61a of the air cylinders 61, 61 are controlled and set to a contracted state. Consequently, as shown in FIG. 8, the holding members 64, 64 move closer to each other, the article housing space 3b becomes smaller, and thus the articles X are collected to the center and gathered into a batch.

Figure 9:
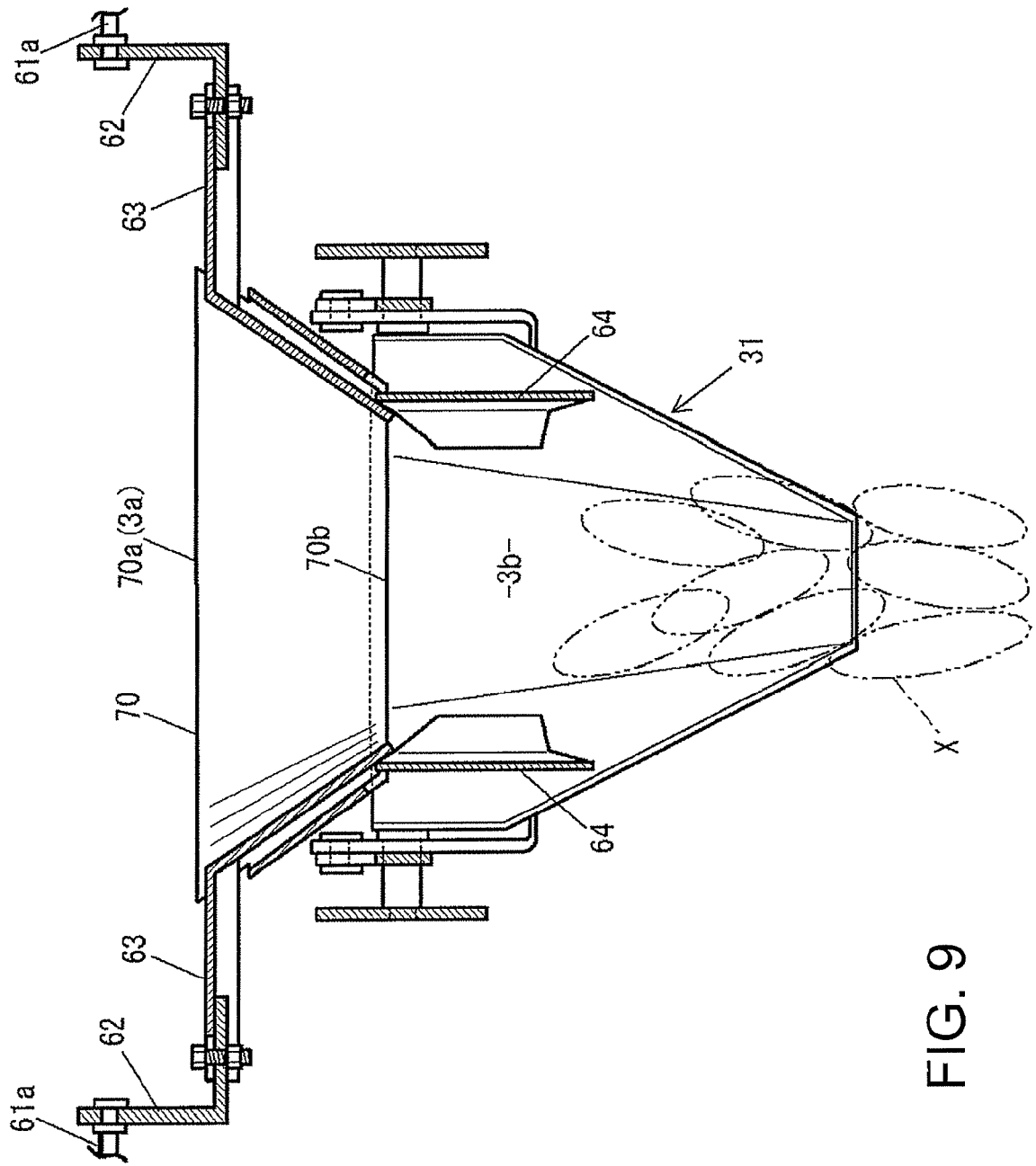
FIG. 9 is a view corresponding to FIG. 6 illustrating a state when the articles are discharged.

Then, at the time of discharging the articles (for example, at a second predetermined period of time after the feeding control of the articles X has started), the gates 31, 32 are controlled by the gate driving device 5 and set to an open state and at the same time the cylinder rods 61a, 61a of the air cylinders 61, 61 are controlled and set to an extended state. Consequently, as shown in FIG. 9, the holding members 64, 64 move away from each other, the article housing space 3b becomes larger, and the articles X are released. As a result, the articles X smoothly drop downward. Here, when the opening operation of the gates 31, 32 is performed, since the holding members 64, 64 are moved away from each other, the contact resistance between the articles X and the holding members 64, 64 is eliminated, and the articles X are discharged downward in a gathered state (in other words, a batch state is maintained). As a result, the tailing of the articles X will not easily occur.

In addition, at the time of discharging, the articles X are not simply gathered into a batch. The gap between the holding members 64, 64 when they are close to each other is set such that a batch of articles X gathered together is smaller than the receiving opening 4a in a plan view. Accordingly, the articles X discharged from the storage hopper 3 will freely and smoothly pass through the receiving opening 4a of the packaging device 4 and an article drop path that follows thereafter.

As described above, with the storage hopper 3, after the articles are received into the article housing space 3b, a holding state of the article holding change mechanism 60 with respect to the articles X is changed to a state in which the articles are gathered. Thus, the tailing of the articles X to be discharged will not easily occur, and acceleration of the process can be achieved.

In addition, the gates 31, 32 are beak-shaped with a downward pointing end in a lateral view, thus providing an effect that the gates 31, 32 can themselves gather the articles.

Further, the holding members 64, 64 are arranged in the inner space (storage portion) of the storage hopper 3, thus preventing the height of the combination weighing device 1 from becoming large.

Alternative Embodiments (A) In the above embodiment, it is assumed that the cylinder rod 61*a* of the air cylinder 61 can switch between the two states: an extended state and a contracted state. However, if the extension and contraction of the cylinder rod 61*a* can be adjusted in multiple stages, it is conceivable to finely change the gap between the holding members 64, 64 of the article holding change mechanism 60 when they are close to each other. For example, the supply air pressure to the air cylinders 61, 61 can be made variable, or an electric ball screw can be used instead of the air cylinders 61, 61. By so doing, it is possible to finely adjust the gap between the holding members 64, 64 of the article holding change mechanism 60 when they are close to each other. When the article holding change mechanism 60 is configured in this way, a state in which the articles are gathered can be changed according to the properties (characteristics) and amount of the articles, and thus the need to replace the article holding change mechanism 60 for each type of articles will be eliminated.

(B) In the above embodiment, at the time of discharging the articles, the gates 31, 32 are controlled by the gate driving device 5 and set to an open state and at the same time the cylinder rods 61*a*, 61*a* of the air cylinders 61, 61 are controlled and set to a contracted state.

However, when the contact resistance between the holding member 64 of the article holding change mechanism 60 and the articles X hardly becomes a problem, a state in which the articles are released at the time of such discharging may be omitted.

(C) In the above embodiment, the holding members 64, 64 extend substantially vertically in a lateral view. However, the holding members 64, 64 may be inclined such that the distance therebetween widens in the downward direction.

Second Embodiment

Configuration of Combination Weighing Device

Figure 10:
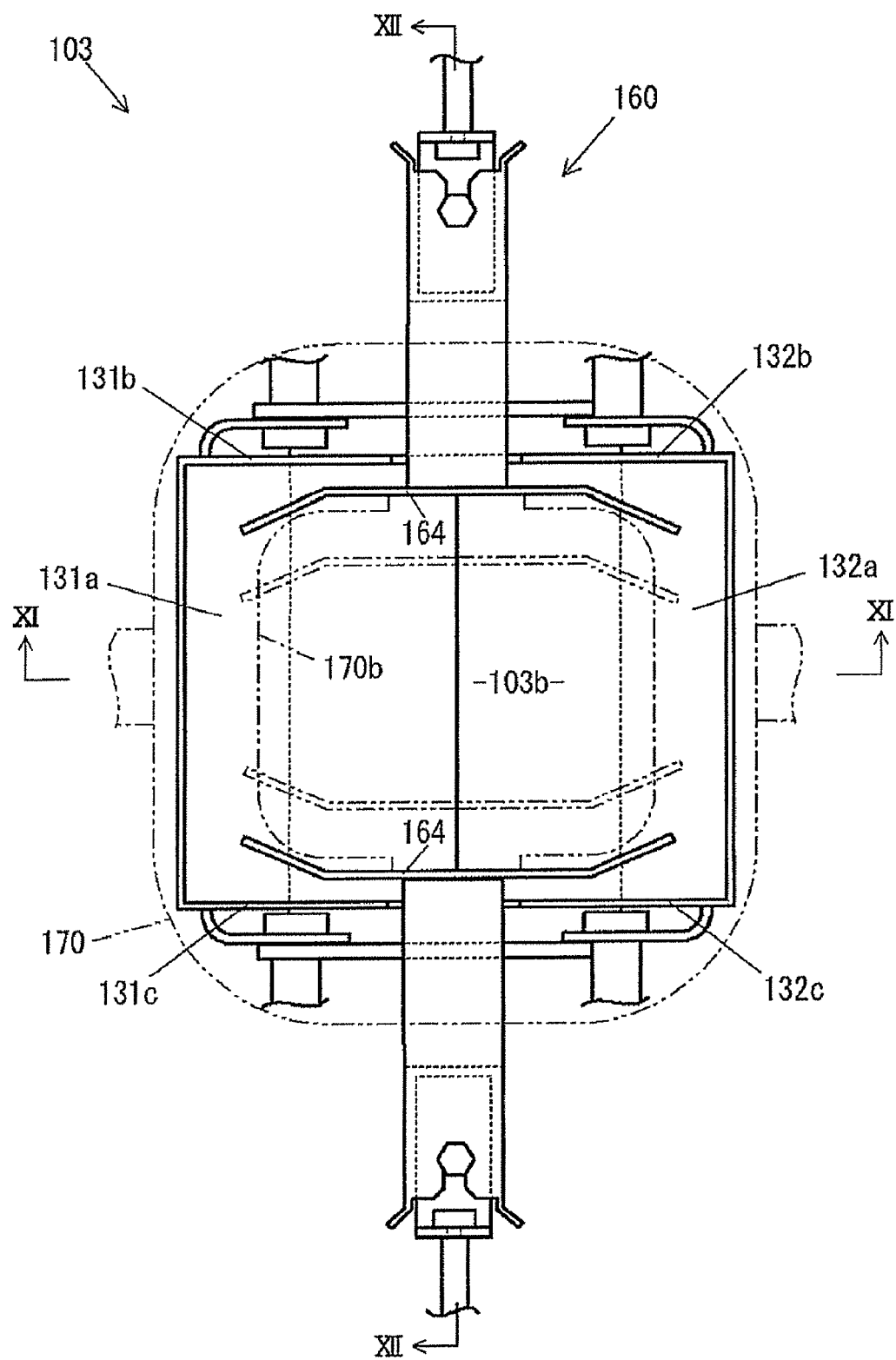
FIG. 10 is a top plan view corresponding to FIG. 2 illustrating a storage hopper according to a second embodiment of the present invention.
Figure 11:
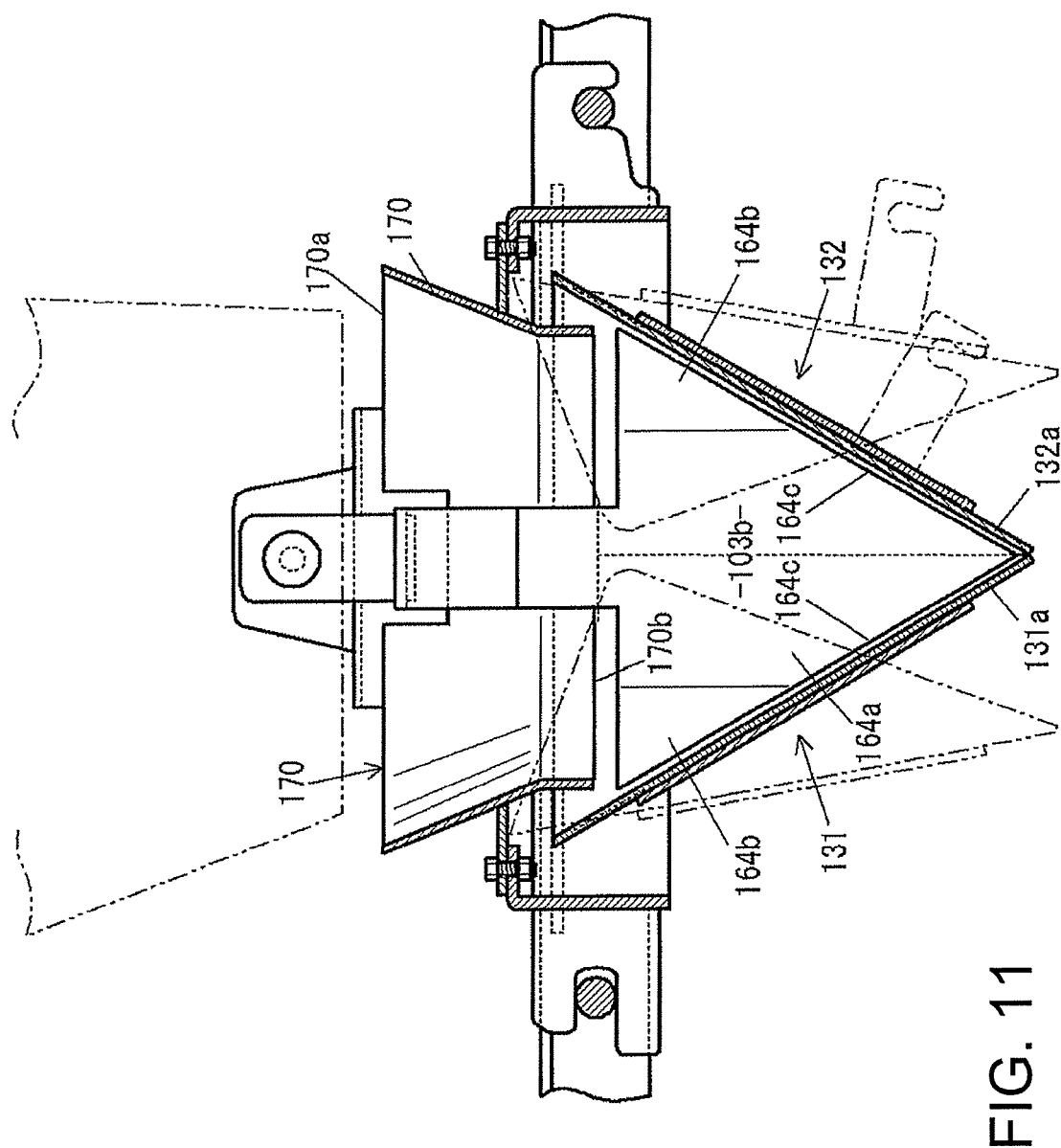
FIG. 11 a cross sectional view taken along line XI-XI in FIG. 10.
Figure 12:
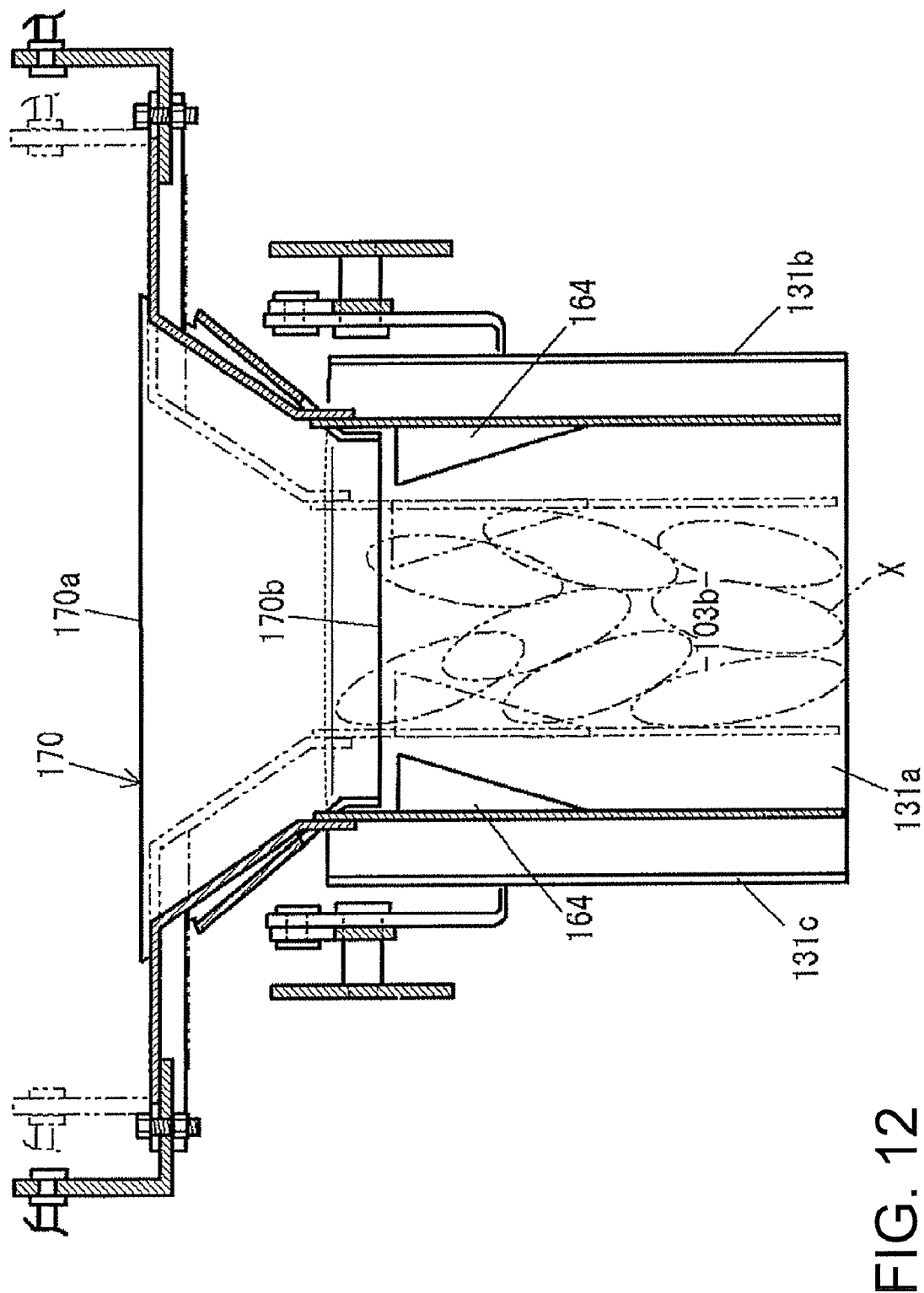
FIG. 12 a cross sectional view taken along line XII-XII in FIG. 10.

In a second embodiment, as shown in FIGS. 10 to 12, gates 131, 132 of a storage hopper 103 includes base portions 131*a*, 132*a* and lateral side portions 131*b*, 131*c*, 132*b*, 132*c*. The lateral side portions 131*b*, 131*c*, 132*b*, 132*c* extend in the direction perpendicular from both lateral ends of the base portions 131*a*, 132*a*. An opening portion surrounded by the lateral side portions 131*b*, 131*c*, 132*b*, 132*c* is formed at the top end of the gates 131, 132. As shown in FIG. 10, this opening portion has a quadrangular shape in a plan view.

In addition, as well illustrated in FIG. 11, a holding member 164 has a generally inverted isosceles triangular shape in a front view, and includes a base surface portion 164*a* and lateral side portions 164*b*, 164*b*. The lateral side portions 164*b*, 164*b* extend from both lateral upper portion of the base surface portion 164*a* toward the opposite holding member 164 side and then to the left and right. When the gates 131, 132 are in a closed state, a pointing end (lower end) of the holding member 164 extends to a pointing end (lower end) of the gates 131, 132, and lateral peripheral portions 164*c*, 164*c* of the holding member 164 are disposed so as to come close to the inner surfaces of the gates 131, 132. In addition, the rim of a lower opening 170*b* of a guide member 170 has a generally quadrangular shape so as to be located inward of the holding member 164 in a plan view (see the lower opening 170*b* indicated by two-dot chain lines in FIG. 10).

Operation of Combination Weighing Device

With the storage hopper 103 of this combination weighing device, in addition to the effect of the storage hopper 3 of the first embodiment, even the articles X accumulated in the lower portion of an article housing space 103*b* can be gathered to the center in a favorable manner as indicated by imaginary lines (two-dot chain lines) in FIG. 12 since the lower ends of the holding members 164, 164 extend to the pointing ends (lower ends) of the gates 131, 132.

Other Embodiments (1) When an electric ball screw can be used instead of the air cylinders 61, 61 so as to finely change the degree of how close the holding member 64 or the holding member 164 comes to the center, it is possible to optimize the state of the articles X discharged from the storage hoppers 3, 103 as described below, according to the characteristics of the articles X such as fragility and the amount of the articles X.

Figure 13A:
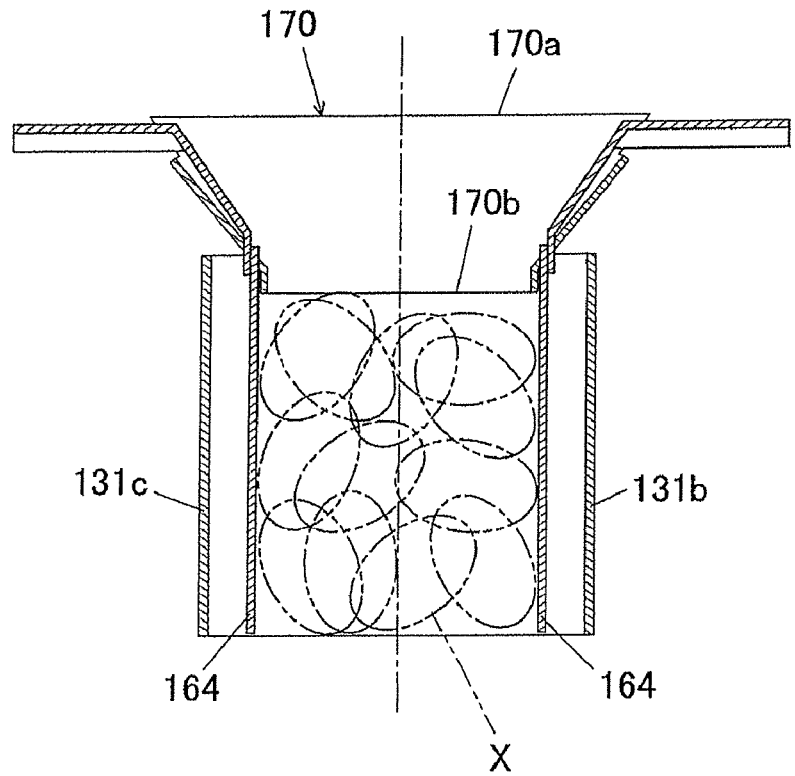
FIG. 13A is a view corresponding to FIG. 12 illustrating a storage hopper according to another embodiment (1) of the present invention.
Figure 13B:
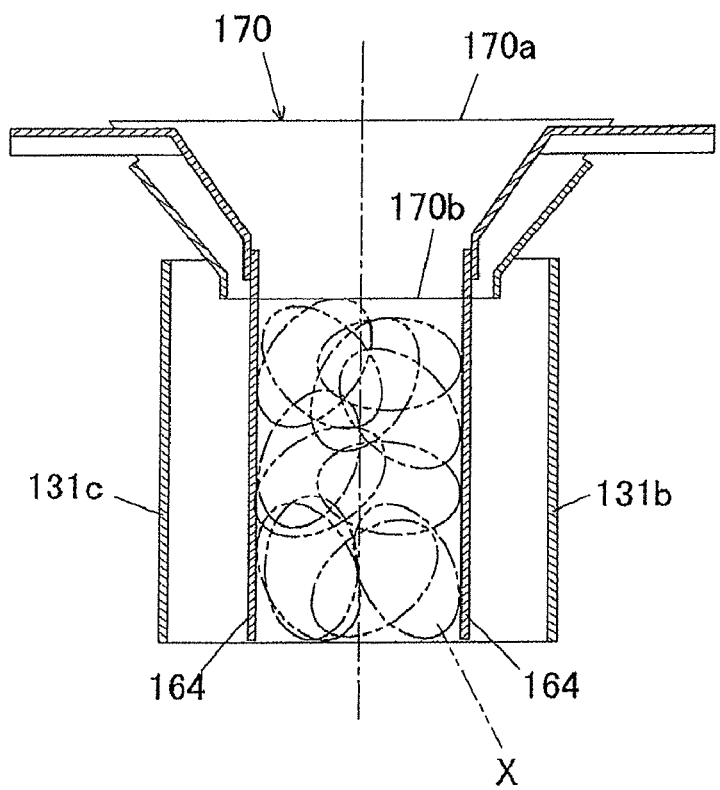
FIG. 13B is a view corresponding to FIG. 12 illustrating the storage hopper according to another embodiment (1) of the present invention.

For example, when the articles X are potato chips that are bagged by the downwardly disposed packaging device 4 and when it is desired to keep the size of each potato chip as it is, the distance between the holding member 164 and the holding member 164 in the storage hopper is set large before receiving the articles X as shown in FIG. 13A. Then, after the articles X are placed in the article housing space of the storage hopper, the holding member 164 and the holding member 164 are moved closer to each other to narrow the gap therebetween as calculated based on the weight, specific gravity, and angle of repose of the articles X, to the point where each potato chip does not get broken (see FIG. 13B). In such a case, in the combination weighing device, it is necessary to input information such as the specific gravity and angle of repose of the articles X in advance.

Figure 14A:
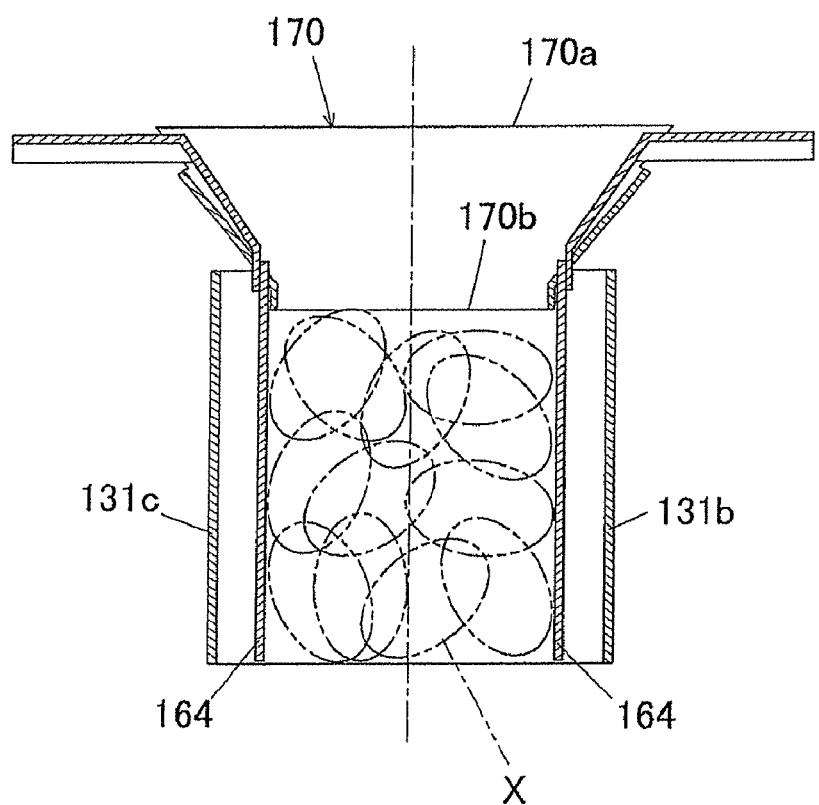
FIG. 14A is a view corresponding to FIG. 12 illustrating the storage hopper according to another embodiment (1) of the present invention.
Figure 14B:
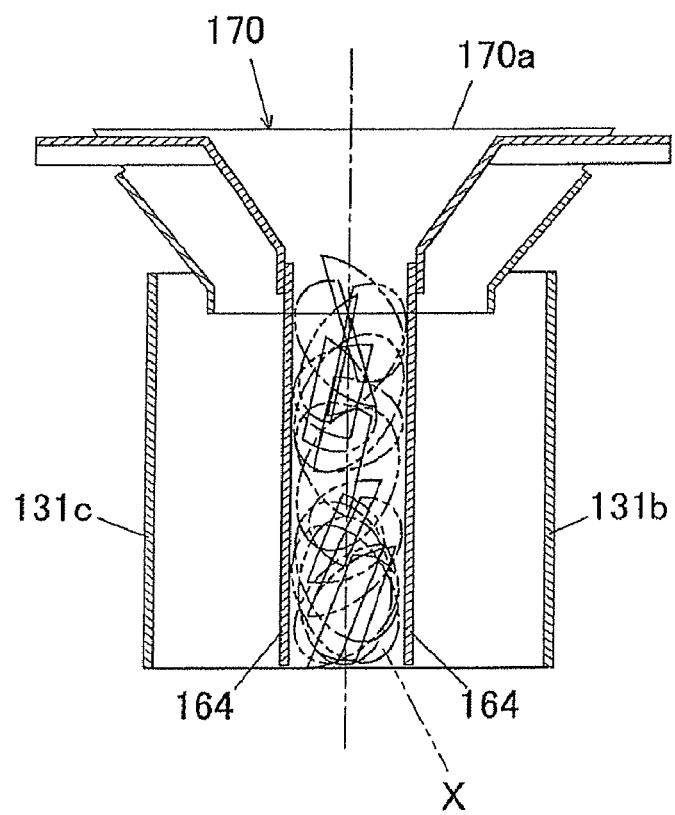
FIG. 14B is a view corresponding to FIG. 12 illustrating the storage hopper according to another embodiment (1) of the present invention.

In addition, for example, when the articles X are potato chips that are bagged by the downwardly disposed packaging device 4 and when each potato chip may be broken in order to reduce the volume of a batch of potato chips, the distance between the holding member 164 and the holding member 164 of the storage hopper is set large as shown in FIG. 14A before receiving the articles X; and the distance between the holding member 164 and the holding member 164 is narrowed as much as possible as shown in FIG. 14B after the articles X are placed in the article housing space of the storage hopper so as to break potato chips to reduce the volume.

(2) When the articles X to be weighed and packaged are articles having an elongated stick shape (see FIGS. 15A and 15B), the holding member 64 or the holding member 164 can be utilized to align the articles X.

Figure 15A:
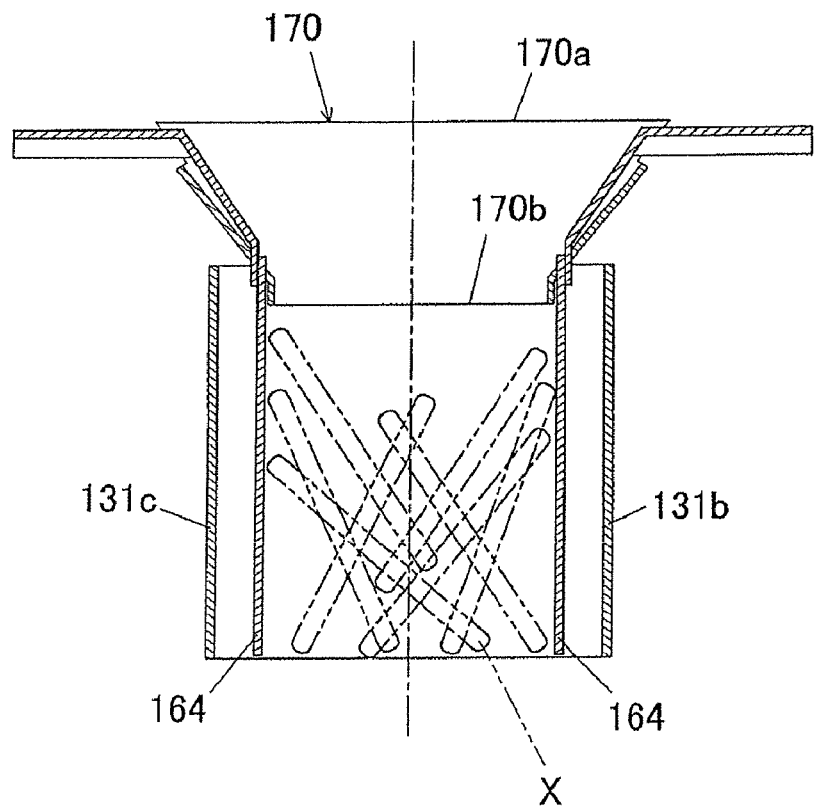
FIG. 15A is a view corresponding to FIG. 12 illustrating a storage hopper according to another embodiment (2) of the present invention.
Figure 15B:
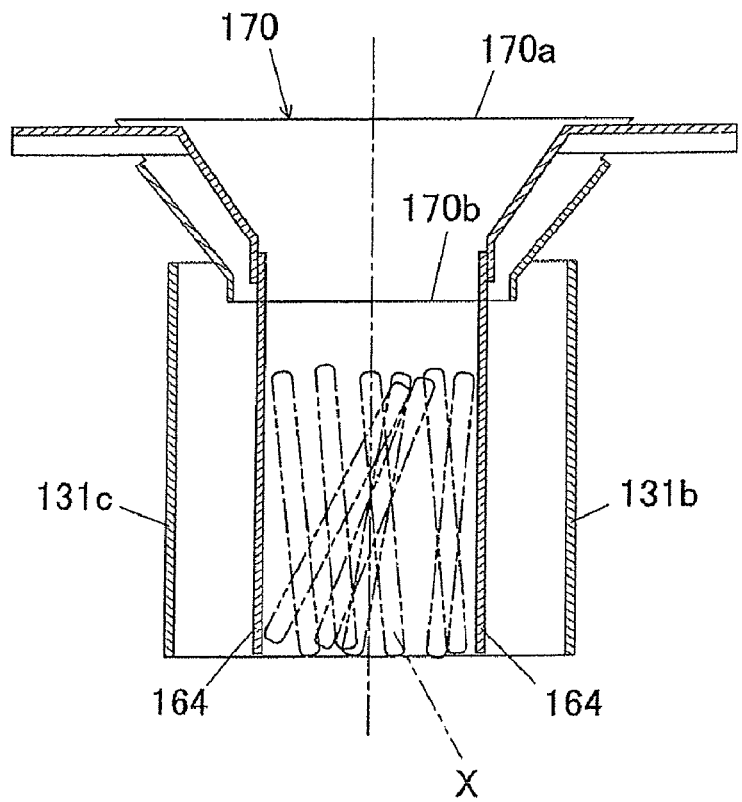
FIG. 15B is a view corresponding to FIG. 12 illustrating the storage hopper according to another embodiment (2) of the present invention.

As shown in FIG. 15A, the distance between the holding member 164 and the holding member 164 of the storage hopper is set large before receiving the articles X; and the distance between the holding member 164 and the holding member 164 is moderately narrowed after the articles X are placed in the article housing space of the storage hopper. In this way, as shown in FIG. 15B, the articles X become closely spaced and aligned at the same time, and the articles X can be discharged in that state to the downwardly disposed packaging device.

Note that the operation to moderately narrow the distance between the holding member 164 and the holding member 164 can be repeated several times when a one-time operation is not enough to sufficiently align the articles X.

(3) The degree of the movement of the holding member 64 or the holding member 164 can be adjusted according to parameters such as the volume, fragility, degree of adhesion of the articles, and the like.

(4) In each embodiment described above, an example is described in which the storage hoppers 3, 103 are part of the combination weighing device. However, the storage hoppers 3, 103 can be configured as part of the packaging device 4. In this case, the storage hopper will be fixed to a frame on which the former 41 and the like of the packaging device 4 are fixed.

In addition, another configuration is conceivable in which an independently operable storage hopper is installed as an optional device for the combination weighing device and the packaging device.

The invention claimed is:

1. A storage hopper configured to temporarily store articles supplied from above and then to discharge the articles downward, the storage hopper comprising:
   a gate unit configured and arranged to selectively form at least part of a storage portion defining a space for storing the articles by switching between a storing position in which the articles are stored and a discharge position in which the articles are discharged; and
   an article holding state changing unit configured and arranged to change a state in which the articles are held in the storage portion according to a state of the articles supplied to the storage portion,
   the article holding state changing unit including a holding member forming a housing space for housing the articles within the storage portion, and a driving device configured and arranged to move the holding member to change a size of the housing space with an amount of movement of the holding member being adjusted according to a volume or characteristics of the articles supplied to the storage portion.

2. The storage hopper according to claim 1, wherein the article holding state changing unit is configured and arranged to gather the articles supplied to the storage portion and to change the state in which the articles are held in the storage portion such that a volume of articles is reduced.

3. A combination weighing device including the storage hopper according to claim 1 to temporarily store the articles discharged from a plurality of weighing hoppers selected by combination calculation, and then to discharge the articles downward.

4. A packaging device including the storage hopper according to claim 1 to temporarily store the articles supplied from above and then to discharge the articles downward for packaging.

5. A storage hopper configured to temporarily store articles supplied from above and then to discharge the articles downward, the storage hopper comprising:
   a gate unit configured and arranged to selectively form at least part of a storage portion defining a space for storing the articles by switching between a storing position in which the articles are stored and a discharge position in which the articles are discharged; and
   an article holding state changing unit configured and arranged to gather the articles supplied to the storage portion and to change a state in which the articles are held within the storage portion such that a volume of the articles is reduced,
   the article holding state changing unit including a holding member forming a housing space for housing the articles within the storage portion, and a driving device configured and arranged to move the holding member to change a size of the housing space such that the housing space becomes smaller when gathering the articles, and the housing space becomes larger when discharging the articles.

6. The storage hopper according to claim 5, wherein the driving device is configured and arranged to move the holding member such that the housing space becomes larger when receiving the articles.

7. A storage hopper configured to temporarily store articles supplied from above and then discharges the articles downward, comprising:
   a gate unit configured and arranged to selectively form at least part of a storage portion defining a space for storing the articles by switching between a storing position in which the articles are stored and a discharge position in which the articles are discharged; and
   an article holding state changing unit configured and arranged to gather the articles supplied to the storage portion and to change a state in which the articles are held within the storage portion such that a volume of the articles is reduced,
   the article holding state changing unit including at least first and second holding members forming a housing space for housing the articles within the storage portion, and a driving device configured and arranged to move the holding member to change a size of the housing space, the driving device being configured and arranged to move the first and second holding members closer to each other when gathering the articles and away from each other when discharging the articles.

8. The storage hopper according to claim 7, wherein the driving device is further configured and arranged to move the first and second holding members away from each other when receiving the articles.

9. The storage hopper according to claim 1, wherein the gate unit includes a pair of members rotatably supported at an upper portion thereof, and configured and arranged to form the storage portion when the gate unit is in the storing position, and to move away from a space below the articles when the gate unit is in the discharging position, and
   the gate unit forms a beak-shape having a downward pointing end in a lateral view.

10. The storage hopper according to claim 1, wherein the holding member extends to the vicinity of a lower end of the gate unit when the gate unit is in the storing position.

* * * * *